United States Patent [19]

Stempinski

[11] Patent Number: 5,054,626

[45] Date of Patent: Oct. 8, 1991

[54] STORAGE RACK

[76] Inventor: George Stempinski, 24 S. Minisink Ave., Sayreville, N.J. 08872

[21] Appl. No.: 582,406

[22] Filed: Sep. 13, 1990

[51] Int. Cl.⁵ ............................................. A47F 5/00
[52] U.S. Cl. .................................. 211/40; 206/387; 211/41
[58] Field of Search .................. 211/41, 120, 40, 20, 211/22; 206/449, 454, 455, 456, 387

[56] References Cited

U.S. PATENT DOCUMENTS

| | | | |
|---|---|---|---|
| 2,702,127 | 2/1955 | Pastorius et al. | 211/41 |
| 4,306,660 | 12/1981 | Livingston | 211/22 X |
| 4,505,393 | 3/1985 | Fleigle et al. | 211/41 |
| 4,600,110 | 7/1986 | Timor | 211/41 X |
| 4,653,650 | 3/1987 | Schülke | 211/41 |
| 4,778,064 | 10/1988 | Gold | 211/41 |

FOREIGN PATENT DOCUMENTS 1016323  1/1966  United Kingdom .................. 211/40

Primary Examiner—Robert W. Gibson, Jr.
Attorney, Agent, or Firm—Lerner, David, Littenberg, Krumholz & Mentlik

[57] ABSTRACT

A storage rack is disclosed for securely holding and displaying cassette packages, disc packages, tape packages and similarly packaged articles through the use of resilient retaining members.

17 Claims, 3 Drawing Sheets

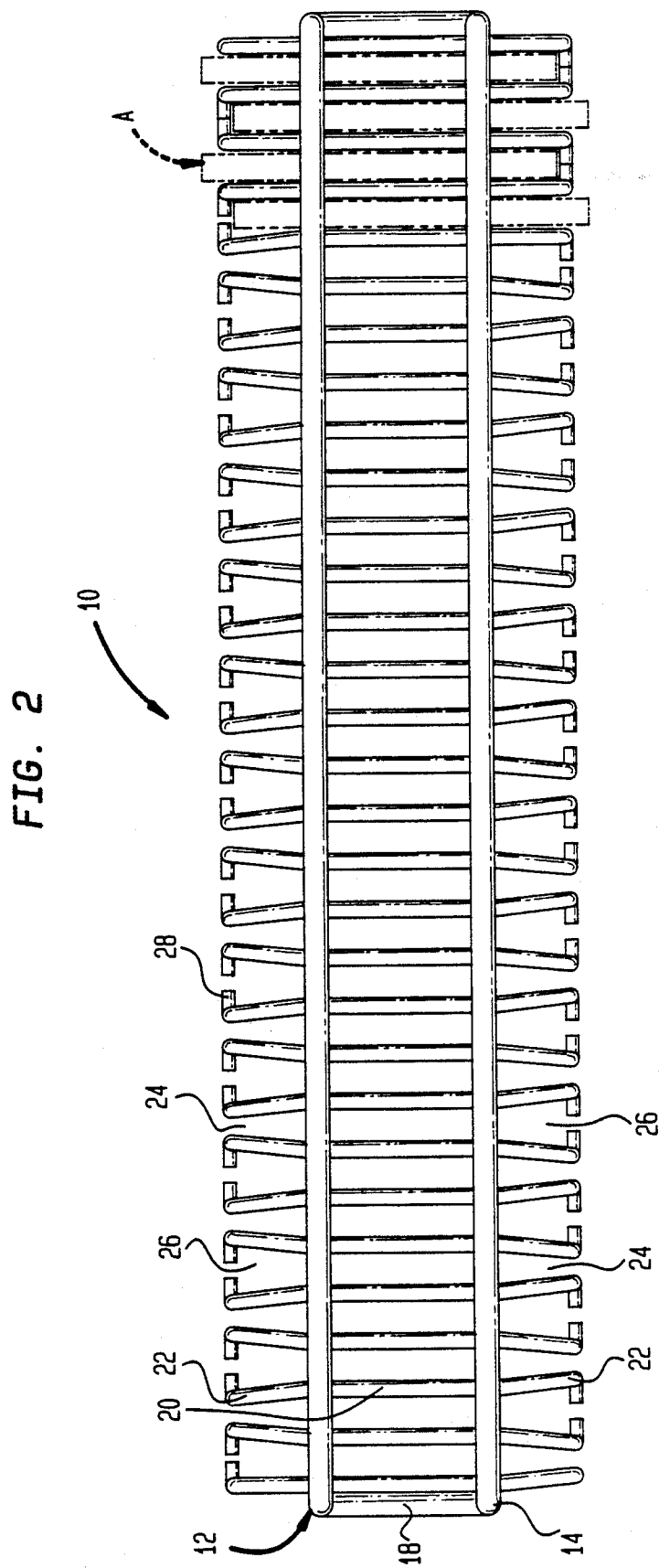

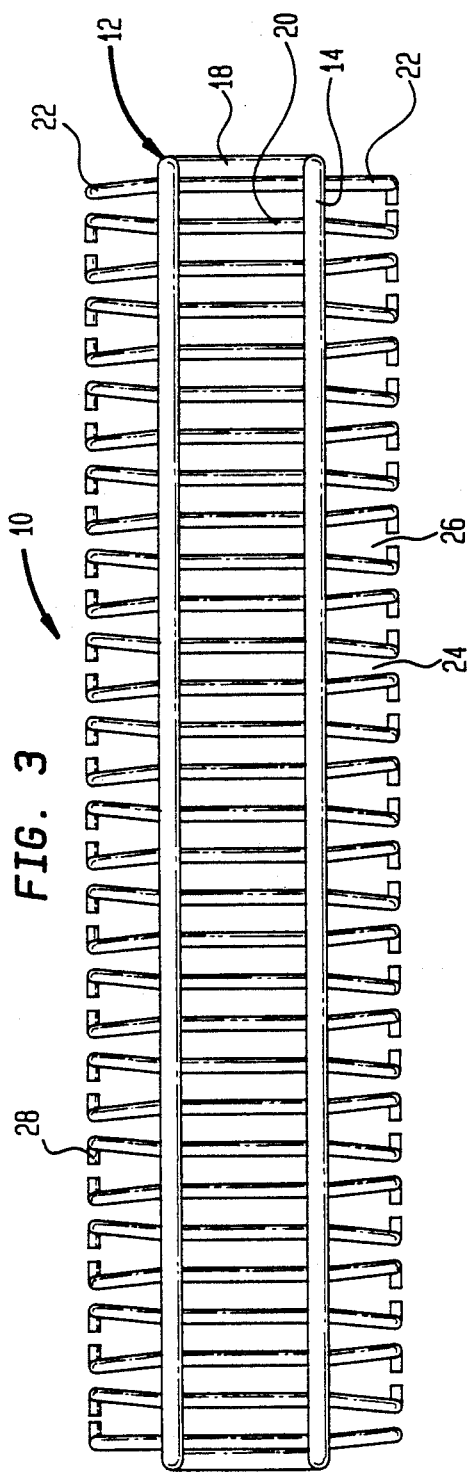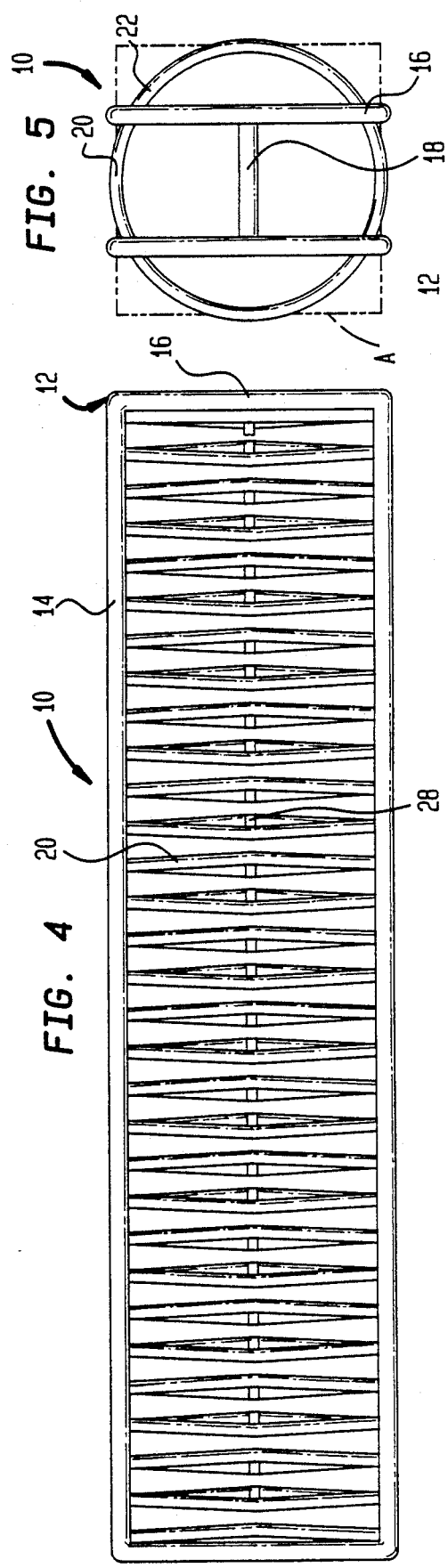

STORAGE RACK

BACKGROUND OF THE INVENTION

The present invention relates generally to storage racks for storing audio and video tapes, cassettes and discs, and more particularly to a storage rack for securely holding and displaying compact discs, audio cassettes, eight-track tapes, video tapes and the like.

The storage and display of cassettes and discs or other similarly packed articles is of some concern since articles of this type are typically quite expensive and should be maintained in the best possible condition. Professionals (such as disc jockeys) and recreational users (hobbyists) of audio and video cassettes and discs prefer storage racks which will securely hold the cassettes or discs to avoid damage to the same should the rack be accidentally tilted or knocked over. It is also desirable that the cassettes or discs be displayed in open view and be readily accessible to the professional or recreational user, and that the rack itself be capable of being transported without fear of losing or damaging the cassettes or discs stored therein.

There are currently on the market several storage racks for holding and, in some cases, displaying audio and video discs and cassettes, or other similarly packaged articles. Although some of these storage racks are portable or at least intended to be easily moved or perhaps stacked, most such storage racks do not include any means for securing the cassettes or discs within the rack so that the cassettes or discs will not fall from the rack if the rack is inadvertently knocked over or tilted.

Some storage racks are provided with means for locking cassettes or discs therein. These locking type storage racks often have clips, springs and other mechanical contrivances arranged in association with the storage spaces in order to facilitate such locking. Although such springs, clips and other mechanical contrivances are not technically sophisticated, the manner in which they function is intricate enough so that they are difficult to assemble during the manufacture of the rack; can often break or become misaligned during use; and require more manipulation than one would desire when inserting and removing cassettes or discs. Some such storage racks may even require the use of two hands when inserting or removing articles, even if the second hand is required merely to hold the entire rack steady during such insertion or removal.

One such locking type storage rack includes a spring-actuated button which is mounted on the side of a storage space and includes an angled slide surface in the form of a truncated corner so that when an article is pushed against the slide surface, the button moves away from the storage space to permit the article to be fully inserted therein. Once the article clears the button, the spring forces the button into a locking position to secure the article in the storage space. To remove the article, the button must be depressed against the force of the spring to the release position.

Portable containers for holding cassettes and discs are also known, but do not provide means for displaying the cassettes or discs while such cassettes or discs are secured in the container. Indeed, the securing of cassettes or discs in such portable containers is typically accomplished by a single cover which covers all cassettes and discs stored in the container while at the same time closing the container.

The above-noted shortcomings with respect to the storing and displaying of cassettes and discs makes it apparent that significant improvements in the design of storage racks for cassettes and discs are desirable. The features of at least an embodiment of such an improved storage rack include that of being a simply structured unit, while still providing for the securement of cassettes and discs therein.

SUMMARY AND OBJECTS OF THE INVENTION

The present invention specifically relates to a storage rack for holding articles such as cassettes, discs and similarly packaged goods, such storage rack including a frame and a plurality of retaining members connected to the frame to define storage spaces between adjacent retaining members, each retaining member having first and second end sections which are made of a resilient material and are offset from one another in opposite longitudinal directions so that every other storage slot on either side of the storage rack has an area of decreased width (all other slots having areas of increased width), such that when an article is inserted therebetween the respective end sections move outwardly to enlarge the storage space for the article, yet maintain a normally inward force by reason of their resiliency, thereby securing the article in the respective storage space. A further aspect of the present invention facilitates the securement of an article on both sides of the storage rack, that is, in the area of decreased width as well as in the area of increased width. The securement of the article in the area of increased width is facilitated when articles are inserted in the storage spaces on either side thereof, thereby effectively moving the respective end sections of the retaining members into contact with the article in the area of increased width. The provision of stop means is also contemplated to prevent articles from being inserted in one side of the storage rack and directly out the other, such stop means being provided on the end sections of the retaining members which define the area of increased width. The stop means are directed towards one another in the longitudinal direction in the area of increased width so that when the retaining members are moved towards one another, an article in the area of increased width can not be moved laterally through the respective storage space.

Thus, it is an object of the present invention to provide a storage rack which is simply constructed and provides for the securement of cassettes, discs or other articles so that the same will not fall from the storage rack if the same is tilted or knocked over.

It is another object of the present invention to provide a storage rack which displays cassettes, discs and similarly packaged articles on two sides of said rack.

It is another object of the present invention to provide a storage rack having retaining members arranged adjacent one another to provide storage slots, such retaining members being constructed and arranged to secure cassettes, discs or other articles without additional locking means.

It is another object of the present invention to provide a storage rack having retaining members which are arranged one adjacent another to define storage slots and which are constructed and arranged to cooperate with one another in securing cassettes, discs and other articles on either side of the storage rack.

It is yet another object of the present invention to provide a storage rack having retaining members defining storage slots and being constructed of a resilient material so that at least portions of adjacent retaining members are capable of resiliently securing cassettes, discs or other articles in the storage slot.

The above and other objects of the present invention can be realized by a storage rack comprising a plurality of retaining members fixed in adjacent relationship to one another in order to define a plurality of storage slots for the storage and display of articles on a first side and a second side of the storage rack, wherein the retaining members provide access to at least a portion of the storage slots from the first side of the storage rack and access to at least the remaining portion of the storage slots from the second side of the storage rack, and the retaining members are adapted to secure articles therebetween.

BRIEF DESCRIPTION OF THE DRAWINGS

The foregoing and other objects of the present invention will become apparent, as will a better understanding of the concepts underlying the present invention, by reference to the description which follows and refers to the accompanying drawings in which:

FIG. 2 is a top plan view of the storage rack shown in FIG. 1, illustrating in phantom four articles (compact discs) stored in adjacent storage slots;

FIG. 3 is a top plan view of the storage rack shown in the preceding Figures, but without articles stored therein;

FIG. 4 is a front elevational view of the storage rack shown in FIG. 3; and

FIG. 5 is a right side elevational view of the storage rack shown in FIG. 2, illustrating in phantom the articles stored in such storage rack.

DETAILED DESCRIPTION OF THE INVENTION

Figure 1:
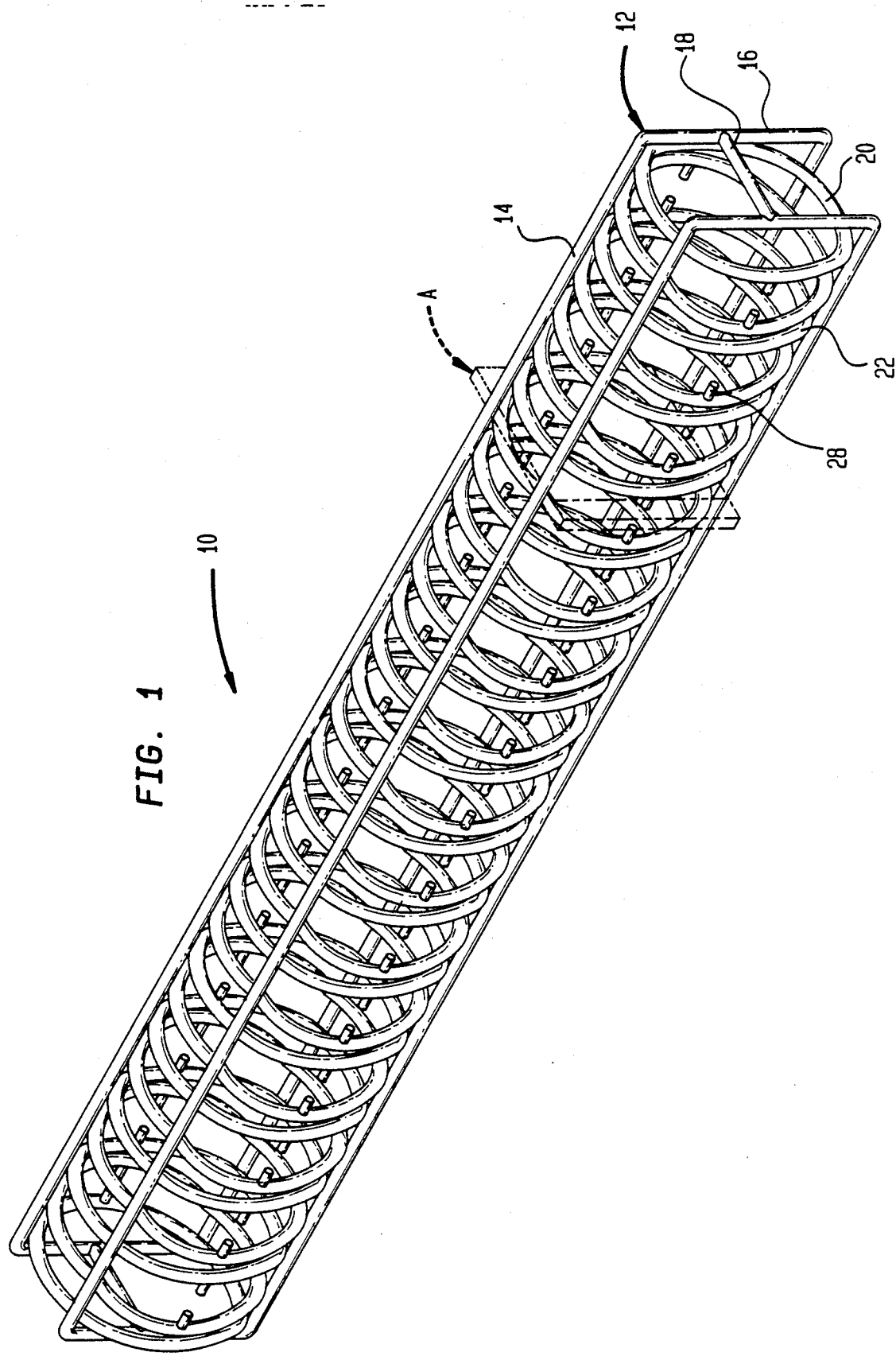
FIG. 1 is an isometric view of a storage rack in accordance with the present invention, illustrating in phantom an article (compact disc) stored therein.

FIGS. 1-5 illustrate the preferred embodiment of a storage rack generally designated as 10 in accordance with the present invention. Storage rack 10 includes a frame member 12 which, in the preferred embodiment, is made up of four longitudinal members 14, two on the top and two on the bottom of the storage rack 10. The longitudinal members 14 on the top of the storage rack are connected to their corresponding longitudinal members 14 on the bottom of the storage rack by side members 16, of which there are also four, two on the right side and two on the left side of the storage rack 10. In effect, the longitudinal members 14 and side members 16 which are provided towards the front of the storage rack 10 define a rectangular shaped member, as shown in FIG. 4. The longitudinal members 14 and side members 16 which are provided towards the rear of the storage rack 10 form a similar rectangular shaped configuration when viewed from the rear—that is, the mirror image of FIG. 4. Two laterally extending cross members 18 are provided on the sides of the storage rack 10 to connect the respective longitudinal members 14 and side members 16, as shown in FIGS. 3 and 5. The cross members 18 thus provide some structural integrity to the frame member 12.

The frame member 12 is preferably constructed of rod-like plastic members for purposes of cost and manufacture. In the preferred embodiment, at least a portion of these members is resilient, as will be discussed further below. However, any suitable material can be used to construct the frame member 12. Indeed, the frame member 12 can also be of any suitable shape, construction or arrangement other than that which is depicted in the figures herein.

Disposed within the frame member 12 are a plurality of ring-shaped retaining members 20. The retaining members 20 are transversely arranged between the longitudinal members 14 in adjacent relationship to one another. The retaining members 20 can be secured to the longitudinal members 14 or to the side members 16, by any conventional means, including spotwelding, adhesive, etc. It is particularly noted that the retaining members 20 can be of any suitable shape consistent with the objects underlying the present invention. Thus, the use of square, rectangular, or any other shape is contemplated.

As best shown in FIGS. 2 and 3, the retaining members 20 define storage slots for storing and displaying articles such as compact discs. Indeed, FIGS. 1, 2 and 5 show a compact disc case securely held between two adjacent retaining members 20. Of course, any similarly packaged article can be stored and displayed in the storage rack 10. The dimensions of the frame member 12 and retaining members 20 might, however, have to be adjusted so that the width, length and other dimensions of the article can be accommodated. In the preferred embodiment of a compact disc storage rack in accordance with the present invention, the inside diameter of the retaining members 20 is approximately 5 ⅛ inches and is made of ¼ inch diameter plastic. The storage slots are approximately ½ inch in width in the medial section thereof while the areas of reduced width on one side of each storage slot is approximately ¼ of an inch, and the area of increased width at the opposite end of the same storage slot is approximately ¾ of an inch. As will be discussed further below, the area of decreased width is adapted to be expanded to approximately ½ inch, while the area of increased width is adapted to be decreased to ½ inch. Of course, the dimensions mentioned herein can be changed to suit different purposes or desires in storing not only different articles, but also for the storage of identical compact discs.

Each retaining member 20 includes securement sections 22 arranged on the front and rear sides of the storage rack 10. The securement sections 22 of each respective retaining member 20 are offset in opposite directions from the remaining portions of the respective retaining member 20, except for the two end retaining members 20 on either side of the storage rack 10. Each of the two retaining members 20 arranged at the remote longitudinal ends of the storage rack 10 include only one offset securement section 22, such securement sections 22 being offset inwardly. It will be recognized from the following that securement sections on the outside of these end retaining members are not required as the only adjacent retaining members are on the inside of these end retaining members. Thus, an outwardly offset end section on the end retaining members of the rack could not cooperate with the end section of the inside adjacent retaining member.

It is desirable that the securement sections 22 of the retaining members 20 are resiliently movable in the longitudinal direction of the storage rack 10. Such resiliency will facilitate the securement of the article A, as will be discussed further below. In the preferred embodiment, such resiliency is obtained by making the retaining members 20 of a resilient material, though only the securement sections 22 need be made of such a material. It is the use of such a material and the arrangement of the securement sections 22 which provides the securement of the article A. The preferable resilient material is a plastic which is easily molded in the form of the retaining members 20 and/or the securement sections 22 thereof. Of course, the resilient movement of the securement sections 22 might be obtained merely by providing a specific construction with a material which is not resilient or less resilient than the preferred plastics. Although not preferred, the use of external means associated with the respective securement sections 22 is also contemplated.

Each of the offset securement sections 22 is arranged so that it cooperates with the offset securement section 22 of the adjacent retaining member 20 except, of course, the two offset securement sections 22 which are immediately adjacent the straight section of the two end retaining members.

More specifically, the securement sections 22 are offset towards one another in pairs such that every other storage slot includes an area of decreased width, or more particularly, a normally closed entrance slot 24 which, in top plan view such as FIG. 3, is in the shape of truncated V. These entrance slots 24 are arranged so that articles to be stored in the storage rack 10 can be inserted therein, as will be discussed further below. Between each of the normally closed entrance slots 24 are areas of increased width, or more particularly, normally open receiving slots 26 which, in top plan view such as FIG. 3, are in the shape of an inverted and truncated V. A receiving slot 26 is provided opposite each entrance slot 24 in each respective storage slot. Thus, receiving slots 26 are adapted to receive the article upon full insertion thereof into the storage slot. It will become more apparent from the following that in the preferred embodiment herein the offset securement sections 22 are resiliently movable, by virtue of their construction and/or the materials of which they are made, such that the normally closed entrance slots 24 and the normally open receiving slots 26 can both be moved to securing positions.

As can be seen in the figures, at least a portion of each entrance slot 24 is less in width than the width of the remaining portions of its corresponding storage slot; and at least a portion of each receiving slot 26 is greater than the remaining portions of its corresponding storage slot, the corresponding storage slot in the preferred embodiment being approximately equal to the width of the article A. It can also be seen that each storage slot includes an entrance slot 24 on either the front or rear of the storage rack 10, and includes a receiving slot 26 on the side opposite therefrom.

Thus, an article can be inserted into the entrance slot 24 of a storage slot and, when fully inserted, received in the receiving slot 26 of such storage slot. To facilitate the insertion of the article into the entrance slot 24, the entrance slot 24 has at least one portion in which the article A can be inserted. It should be noted that since the retaining members 20 in the preferred embodiment are round in cross-section, the insertion of the article is facilitated since the article will first engage the rounded surface of the retaining members 20. This being the case, the width between the centers of adjacent retaining members 20 can actually be less than the width of the Article A. It can therefore be seen that in the preferred embodiment, the insertion of the article should begin at the top (or bottom) of the storage rack 10.

As noted above, it is important that the securement sections 22 be capable of moving from their normally closed alignment with one another to enable the article to be fully inserted into the storage slot, while still exerting the normally inward pressure against the article A when the entrance slots 24 are in the securing positions to thereby facilitate the securement of the same within the storage rack 10.

Once the article is fully inserted into a storage slot, and thus into the respective receiving slot 26, the article A is securely held in the storage rack 10 by at least the cooperation of the securement sections 22 which form the respective entrance slot 24. The corresponding receiving slot 26 will not necessarily aid in securing the article A in the storage rack 10. Securement of the article A by the securement sections 22 which form the corresponding receiving slot 26 will depend upon the insertion of similar articles in adjacent storage slots. FIG. 3 illustrates the closing of the normally open receiving slot 26 when articles are inserted in entrance slots 24 on either side of the receiving slot 26. It is specifically noted that in FIG. 3, the securement section 22 on the fifth retaining member from the right is not forced towards the article A since there is no article in the adjacent slot. Thus, the resiliency of securement sections 22 which form the receiving slot 26 will "clamp" the article therebetween as will the securement sections 22 which form the corresponding entrance slot 24. When this occurs, the article in the storage rack 10 is secured in the storage slot not only by the entrance slot 24, but also by the corresponding receiving slot 26.

At the end of each receiving slot 26, each securement section 22 which forms the same includes an inwardly directed stop post 28. When an article A is inserted into a given storage slot, it is prevented from being pushed through the same laterally, that is, out of the corresponding receiving slot 26 by the stop posts 28. It is noted that the stop posts 28 are of such a length that when their respective securement sections 22 are moved inwardly from their normal positions upon the insertion of an article A on either side of the respective receiving slot 26, the posts may engage one another to redefine the width of the receiving slot 26 to be approximately equal to or somewhat less than the width of the article A, as shown in FIG. 3. This facilitates the securement of the article A therein, particularly if the entrance slots 24 on either side of the respective receiving slot 26 are filled with articles before the receiving slot 26. If this is the case, the redefined width of the receiving slot 26 enables the article A to be inserted therein without binding or without excess space. Rather, the redefined width will be such that the receiving slot 26 will facilitate the securement of the article A therein.

The storage rack 10 shown in the figures herein is intended to securely store and display thirty (30) compact discs—fifteen (15) being accessible from the front and fifteen (15) being accessible from the back of the storage rack 10. Of course, a storage rack in accordance with the present invention can provide for storage, display and access from only one side of the rack instead of from both the front and back. This storage rack 10 is portable and capable of securing the compact discs therein so that the same will not fall from the storage rack 10 if it is inadvertently knocked over or tilted.

To facilitate the portability of the storage rack 10 in accordance with the present invention, a handle or handles can be provided on the frame member 12 or directly on the retaining members 20. The handle can be located in any convenient location such as on the right side of the storage rack 10. The storage rack 10 can also include on the frame member 12, or more specifically the longitudinal members 14, rubber feet or other gripping means so that the rack itself can grip the surface of a table or the like.

The foregoing description of the preferred embodiment of the present invention was directed to a storage rack for compact discs, which are generally square in shape. As noted above, the dimensions of the storage rack 10 can be changed to accommodate articles of different sizes and shapes. This would include articles which are rectangular rather than square in shape such as cassette tapes or video tapes. In the case of storing rectangular-shaped articles, it may be desirable to store the same such that the longitudinal dimension thereof traverses the longitudinal axis of the storage rack 10. In this instance, it may be desirable to employ additional longitudinal members to facilitate the stable securement of the rectangular-shaped articles, and to facilitate the stable seating of the rack itself. It is contemplated that the existing longitudinal members, or similarly located members, will be required to stabilize the rack on a table surface. However, depending upon the dimensions of the rectangular-shaped articles to be stored therein, additional longitudinal members should be provided to facilitate the vertical securement or stability of the rectangular-shaped articles. Such additional longitudinal members would be provided on the retaining members towards the front and towards the rear of the storage rack. In other words, with reference to FIG. 3, the additional longitudinal members would be substantially parallel to the longitudinal members 14 and connected to the retaining members 20 towards the front and the rear of the storage rack—that is, on the outside of the longitudinal members 14. Such additional longitudinal members can be provided on the top and the bottom of the storage rack such that there are four additional longitudinal members—two on the top and two on the bottom. In the case of retaining members which are in the shape of rings, the vertical distance between the upper and lower additional longitudinal members would be less than that between the upper and lower longitudinal members 14. Thus, a rectangular-shaped article can be accommodated on its long edge, yet the lower longitudinal members 14 will maintain the stability of the storage rack 10.

While the foregoing description and figures illustrate the preferred embodiments of the storage rack in accordance with the present invention, it should be appreciated that certain modifications can be made, and are indeed encouraged to be made, in the materials and structure of the disclosed embodiments without departing from the spirit and scope of the present invention which is intended to be captured by the claims set forth below.

What is claimed is:

1. A storage rack for holding a plurality of articles, said storage rack comprising a plurality of retaining members fixed in adjacent relationship to one another to define a plurality of storage slots arranged to provide for the storage and display of articles on a first side and a second side of said storage rack, said retaining members being constructed and arranged to provide access to a first portion of said storage slots only from the first side of said storage rack and access to a second portion of said storage slots only from the second side of said storage rack, said retaining members being further constructed and arranged to secure therebetween articles stored in said storage slots.

2. The storage rack in claim 1, wherein said first portion of said storage slots are alternate storage slots on the first side of said storage rack and said second portion of said storage slots are alternate storage slots on the second side of said storage rack.

3. The storage rack in claim 1, wherein said retaining members are constructed and arranged to secure a given article in a first storage slot at both the first side and the second side of said storage rack only when articles are inserted into the next adjacent storage slots on either side of the first storage slot.

4. The storage rack in claim 3, wherein said retaining members are made of a resilient plastic material and are constructed and arranged so that when an article is inserted into a storage slot, at least a portion of the retaining members which define such storage slot are moved so as to secure such article therein by virtue of their resiliency.

5. The storage rack in claim 4, wherein said retaining members are so constructed and arranged to provide access to said storage slots from the upper portion thereof on the first side and the second side of said storage rack.

6. A storage rack for holding a plurality of articles, said storage rack comprising a plurality of retaining members fixed in adjacent relationship to one another to define a plurality of storage slots arranged to provide for the storage and display of articles on a first side and a second side of said storage rack, said retaining members being constructed and arranged to provide access to alternate storage slots on the first side of said storage rack and access to alternate storage slots on the second side of said storage rack, wherein adjacent retaining members on the first side and the second side of said storage rack cooperate with one another to secure articles in said storage slots, and wherein at least alternate retaining members on said first side have at least one section which is longitudinally offset to thereby decrease the width of the adjacent storage slot in the offset area, and at least alternate retaining members on said second side having at least one section which is similarly offset.

7. The storage rack in claim 6, wherein said offset sections of said retaining members on said first and second sides of said storage rack are offset in the same direction.

8. A storage rack for holding a plurality of articles, said storage rack comprising:
a. a frame; and
b. a plurality of article retaining members spacedly connected to said frame and defining article retaining spaces between adjacent retaining members, each said article retaining member having first and second end sections, each of which is offset from one another in opposite longitudinal directions, said first end sections being so constructed and arranged on a first side of said storage rack to define a first securing area in alternating retaining spaces on said first side of said storage rack and a second securing area in the remaining retaining spaces on said first side of said storage rack, said second end sections being similarly constructed and arranged on a second side of said storage rack laterally opposite said first side, each said first securing area having a corresponding insertion space and a width which is less than a width of said second securing area, said end sections being resilient relative to one another such that when an article having a width which is greater than the width of a first securing area is inserted into the insertion space thereof and into the corresponding retaining space, at least the first securing area will secure such article in the corresponding retaining space, said second securing area being adapted to facilitate the securing of such article when two additional articles are inserted into the adjacent first securing areas on either side of said second securing area.

9. The storage rack in claim 8, wherein said article retaining members are ring-shaped, the axes of which are aligned.

10. The storage rack in claim 9, wherein said first and second end sections of said article retaining members are diametrically opposite on said ring-shaped article retaining members.

11. The storage rack in claim 10, wherein said article retaining members include stop means in said second securing area to prevent articles from being inserted past the end sections which form said second securing area.

12. The storage rack in claim 11, wherein said stop means are arranged on the end sections of said article retaining members, and comprise posts which are spaced from and directed to one another in said second securing area.

13. The storage rack in claim 12, wherein said posts are of such a length and are constructed and arranged to abut one another when their respective end sections are moved towards one another to thereby define the width of the second securing area.

14. The storage rack in claim 11, wherein the insertion area of said first securing area is provided at the top of said storage rack so that an article must be inserted from the top, slid downwardly, and then transversely towards the second securing area of the article retaining space.

15. The storage rack in claim 11, wherein at least said end sections are made of a resilient plastic material.

16. The storage rack in claim 11, wherein said article retaining members are made of a resilient plastic material.

17. The storage rack in claim 8, wherein said first and second securing areas are generally in the shape of a truncated V.

* * * * *